E. H. SNYDER.
CHECK WIRE GUIDE.
APPLICATION FILED MAR. 6, 1916.
1,358,342.
Patented Nov. 9, 1920.
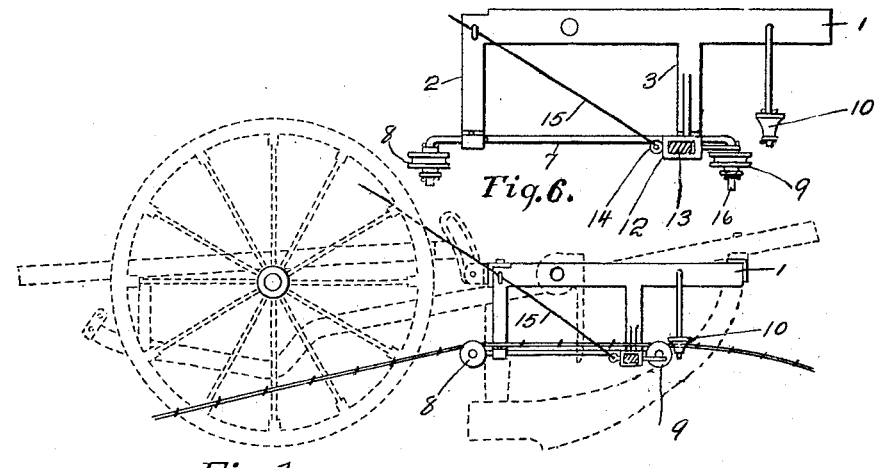
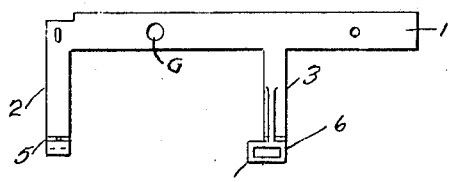
Fig.2
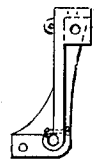
Fig.3
Fig.4
Fig.5
WITNESSES:
Harold Metcalf
Isaac H Joseph
Emmanuel Henry Snyder
INVENTOR.
Andrew Chezem
ATTORNEY

UNITED STATES PATENT OFFICE.

EMMANUELL HENRY SNYDER, OF DAVENPORT, IOWA.

CHECK-WIRE GUIDE.

1,358,342. Specification of Letters Patent. Patented Nov. 9, 1920.

Application filed March 6, 1916. Serial No. 82,400.

*T all whom it may concern:*

Be it known that I, EMMANUELL HENRY SNYDER, a citizen of the United States, residing at Davenport, in the county of Scott, in the State of Iowa, have invented a new and useful Check-Wire Guide Device, of which the following is a specification.

My invention relates to improvemnts in seed planting machines known as check-row planters which are adapted to planting seeds in regular transverse rows and hills, and the objects of my improvements are:

First, to provide a means whereby the check row wire may be carried close to the ground in planting.

Second, to provide a means of releasing or disengaging the check row wire outward from the planter frame without compelling the operator to leave the planter seat for that purpose.

Third, to provide a quicker and safer means of engaging the check row wire upon the guide and check head or check trigger.

Fourth, to provide a lighter checkwire guide, less intricate of construction and more durable.

I attain these objects by the mechanism illustrated in the accompanying drawings, in which—

Figure 1 is a side elevation, showing the check wire guide attached, mounted on the seed can frame, illustrating the connection with the planter in operation, showing the check row wire engaged.

Fig. 2 is a side elevation showing the frame of the check wire guide dismantled, illustrating its construction only.

Fig. 3 is an end elevation showing the construction of the front end of the check wire guide disclosing all protruding objects.

Fig. 4 is an end elevation showing the construction of the rear end of the check wire guide; and with Fig. 3 showing dismantled the frame only.

Fig. 5 is a side elevation of the side guide wheel support, shown dismantled, but when assembled is shown attached to the front end of the frame as in Fig. 6.

Fig. 6 is a side elevation of the check wire guide assembled, the wire disengaged and the device at rest, released, and dismounted from the planter.

Throughout the several views similar letters and figures refer to similar parts.

The drawings themselves better illustrate the mechanism and workings of my invention.

My invention consists of a supporting frame comprising a horizontal member 1 through which the frame is adapted to be attached to the seed can frame of the planter. The horizontal member 1 having dependent members 2 and 3, dependent member 2 being located at the rear end of member 1 and dependent member 3 being located intermediate the ends of member 1 as shown in Fig. 2, bearings 5 and 6 are carried by the lower ends of dependent members 2 and 3 for the reception therein of rotatable bar 7 which bar has its ends bent at right angles thereto and in alinement with each other, thus forming pintles upon which grooved wheels 8 and 9 are adapted to revolve when engaged by a check wire. A dependent rotatable conical shaped member 10 is carried by member 1 and in advance of grooved wheel 9 in such manner and relation thereto as to exert a downward pressure upon a check wire in engagement with grooved wheels 8 and 9. 11 is a housing for the reception of latch pin 12 which is provided with helical spring 13, which spring tends to hold latch pin 12 in operative position as shown in Fig. 1, the latch pin 12 is provided with eyelet 14 at its inner end through which cable 15 passes to the seat of the driver of the planter and by drawing which, latch pin 12 may be withdrawn from under pintle 16, thereby allowing grooved wheels 8 and 9 to drop by gravity to the position shown in Fig. 6, thus releasing the check wire from engagement with grooved wheels 8 and 9.

From the foregoing it will be readily seen that when the end of a row of planting is reached, that the driver of the planter can release the check wire from engagement with the planter by merely drawing on cable 15 and without being obliged to leave the planter seat to disengage the check wire.

Having thus described my invention, what I claim is:

1. In a check wire guide, a supporting frame adapted to be carried by a seed can frame, grooved rotatable members carried thereby and below the seed can frame, a dependent conically shaped member carried by said supporting frame and in advance of said rotatable members, means for holding said rotatable members in operative position.

2. In a check wire guide, a supporting frame adapted to be affixed to a seed can frame, grooved rotatable members mounted on said supporting frame and below the plane of the seed can frame, a dependent conically shaped member carried by said supporting frame and in advance of said rotatable members and means for releasing a check wire from engagement with the last named members.

3. In a check wire guide, a supporting frame carried by the seed can frame of a planter, grooved rotatable members carried by said supporting frame and below the plane of the seed can frame, a dependent conically shaped member carried by said supporting frame and in advance of said rotatable members and means for releasing a check wire from engagement with the last named members by gravity.

4. In a check wire guide, a supporting frame carried by the seed can frame of a planter, grooved rotatable members carried by said supporting frame and below the plane of the seed can frame, a dependent conically shaped member carried by said supporting frame and in advance of said rotatable members, and spring actuated means for holding said rotatable members in contact with a check wire.

5. In a check wire guide, a supporting frame carried by the seed can frame of a planter, grooved rotatable members carried by said supporting frame and below the plane of the seed can frame, a dependent conically shaped member carried by said supporting frame and in advance of the said rotatable members, a spring actuated latch pin adapted to hold said rotatable members in contact with a check wire and means for controlling said spring actuated latch pin.

All substantially as shown.

EMMANUELL HENRY SNYDER.

Witnesses:
HAROLD METCALF,
ISAAC H. JOSEPH.